United States Patent
Thomas

(10) Patent No.: US 6,354,826 B1
(45) Date of Patent: Mar. 12, 2002

(54) PIN FOR GAS ASSISTED INJECTION MOLDING SYSTEM

(75) Inventor: Ronald Thomas, Mt. Clemens, MI (US)

(73) Assignee: Alliance Systems, Inc., Chesterfield, MI (US)

(*) Notice: Subject to any disclaimer, the term of this patent is extended or adjusted under 35 U.S.C. 154(b) by 0 days.

(21) Appl. No.: 09/253,804

(22) Filed: Feb. 19, 1999

(51) Int. Cl.[7] ................................. B29C 45/17
(52) U.S. Cl. .................. 425/130; 425/569; 264/572
(58) Field of Search ................... 264/572; 425/568, 425/569, 571, 535, 536, 546, 130

(56) References Cited

U.S. PATENT DOCUMENTS

| | | | | |
|---|---|---|---|---|
| 4,106,887 A | * | 8/1978 | Yasuike et al. | 425/549 |
| 4,740,150 A | | 4/1988 | Sayer | 425/542 |
| 4,855,094 A | * | 8/1989 | Hendry | 264/40.3 |
| 4,905,901 A | * | 3/1990 | Johnson | 239/135 |
| 5,039,463 A | | 8/1991 | Loren | 264/40.3 |
| 5,118,455 A | | 6/1992 | Loren | 264/40.3 |
| 5,127,814 A | * | 7/1992 | Johnson et al. | 425/130 |
| 5,151,278 A | | 9/1992 | Baxi et al. | 425/130 |
| 5,164,200 A | * | 11/1992 | Johnson | 425/130 |
| 5,198,238 A | | 3/1993 | Baxi | 425/130 |
| 5,208,046 A | * | 5/1993 | Shah et al. | 425/130 |
| 5,232,711 A | * | 8/1993 | Hendry | 425/130 |
| 5,284,429 A | | 2/1994 | Schneider et al. | 425/130 |
| 5,295,800 A | | 3/1994 | Nelson | 425/130 |
| 5,464,342 A | * | 11/1995 | Marik et al. | 425/533 |
| 5,482,669 A | | 1/1996 | Shah | 264/572 |
| 5,820,889 A | | 10/1998 | Erikson | 425/130 |

FOREIGN PATENT DOCUMENTS

| | | | |
|---|---|---|---|
| TW | 333900 | * | 6/1998 |
| TW | 339733 | * | 9/1998 |

* cited by examiner

Primary Examiner—Nam Nguyen
Assistant Examiner—Joseph S. Del Sole
(74) Attorney, Agent, or Firm—Dinnin & Dunn, P.C.

(57) ABSTRACT

A nozzle having an internally threaded bore communicating through a mold body with a source of a pressurized gas, and an externally threaded pin received within and engaging the threaded bore. The pin has a machined longitudinal surface creating an air passage through the bore when the pin is in place. At the outlet end of the nozzle the pin carries one or more washers having air passages machined therein.

11 Claims, 1 Drawing Sheet

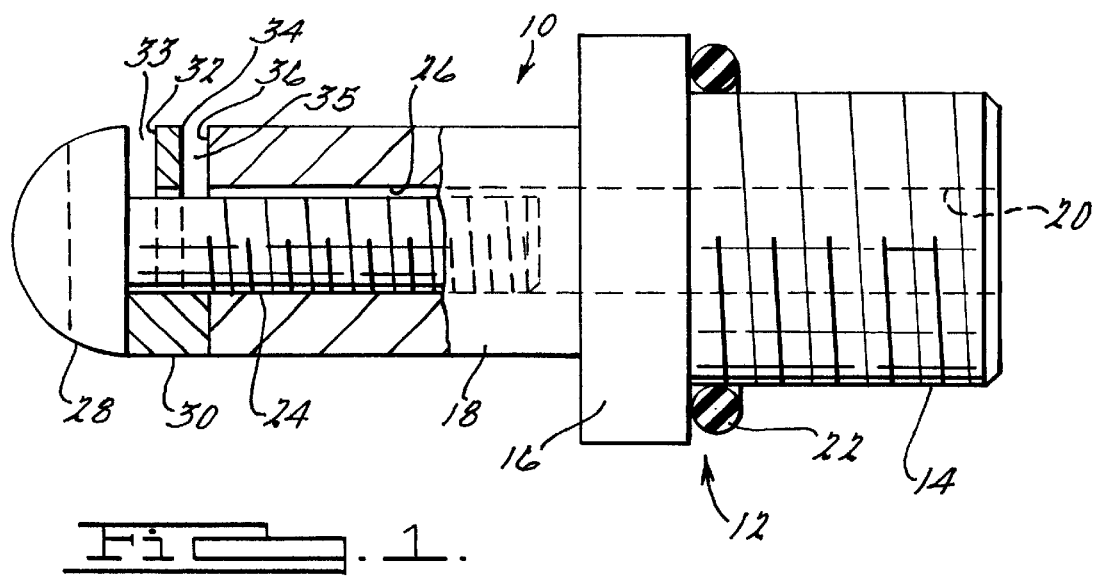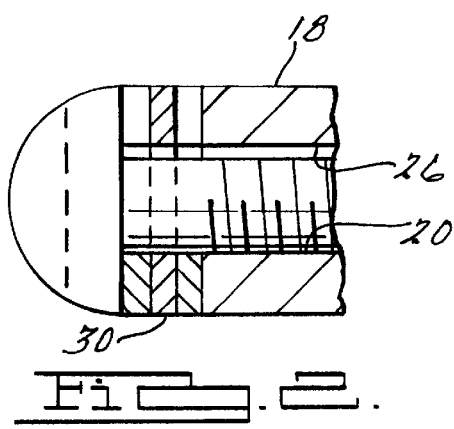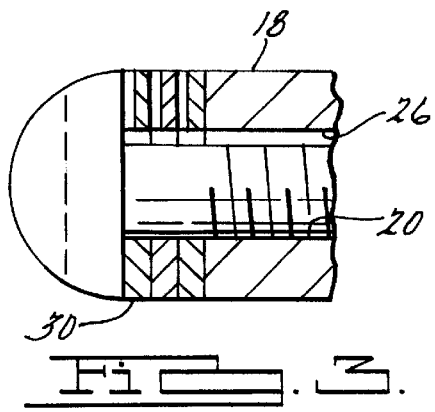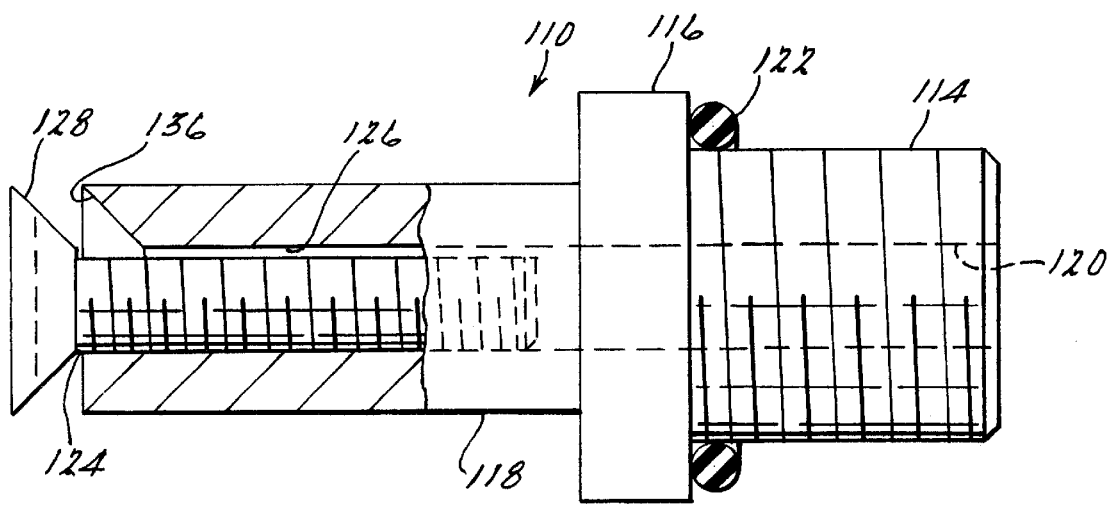

PIN FOR GAS ASSISTED INJECTION MOLDING SYSTEM

BACKGROUND OF THE INVENTION

Gas assisted injection molding of plastic has long been known in the industry. Briefly stated, molten plastic is forced into an enclosed mold, and gas is injected into the mold within the plastic material. The gas raises the internal mold pressure, and creates an expanding gas pocket, which forces the cooling plastic to the extreme recesses of the mold, yielding a better fill out of the mold surface and reducing the sag of the plastic from the mold surface as the plastic shrinks during cooling, thus producing a better finished surface. The gas also creates an internal cavity within the molded part which reduces the weight of the part and reduces the amount of plastic required, thus reducing material cost.

There are a variety of methods and apparatuses for injecting gas into a mold, whether the gas is injected at a varying pressure and whether the gas is injected through the plastic injection nozzle or remotely. Remote gas injection locations include injecting directly into the mold cavity (in article) or into a channel leading into the mold (in-runner). Due to the higher gas pressures generally required for dual plastic/gas injection nozzles, and the associated expense for valving for the resin and gas flows, the injection of gas remotely is generally preferred.

Nozzles for use in-article or in-runner remote gas injection devices are subjected to packing by the molten plastic injected into the mold. Such gas injection nozzles are typically located near the plastic injection nozzle so that the gas injected can best assist the flow of the plastic material throughout its flow through the mold. This however typically subjects the gas injection nozzles to the flow of molten plastic at its most liquid state and highest pressure, which tends to clog or pack air injection nozzles. Further, gas injection nozzles are typically used as gas exhaust outlets, so that any molten material will tend to flow toward and into the outlet during the venting process. Cycle time of the molding process is critical to production cost, so venting before the interior of the part has completely cooled may be desirable, creating the potential condition for uncooled material flow toward the gas nozzle. To inhibit the flow of molten resin into the gas nozzle, two approaches have typically been used: a valved fluid nozzle (i.e. U.S. Pat. No. 5,232,711), or to use an injection pin with very small orifices which tend to resist the flow of the molten resin (i.e. U.S. Pat. No. 5,820,889). Another method employed to avoid the clogging of the gas supply passages with molten resin is to delay gas injection until the plastic injection is completed, as described in U.S. Pat. No. 5,295,800. However, this allows the plastic to cool somewhat, which reduces the flowability of the material, and reduces the efficacy and efficiency of the gas injection process.

The use of valved gas nozzles adds complexity and expense to the entire system. Injection molding is a relatively high production process, so such nozzles are subjected to repeated exposure to molten resin under pressure, which inevitably leads to the intrusion of resin into the inlet. Further, a valved nozzle typically includes a reciprocating motion opposing the intrusion of plastic or overcoming the gas injection pressure, a motion that requires a relatively large force which inevitably leads to wear and failure. Repairing or replacing such reciprocating nozzles or valves is time consuming and expensive in material cost and in down time. Examples of reciprocating nozzles or pins are shown in U.S. Pat. Nos. 4,740,150; 4,905,901; 5,151,278; 5,164,200; 5,198,238 and 5,464,342. Reciprocated nozzles or pins may limit material intrusion during material injection, but have little effect upon material intrusion during venting if venting is conducted through the nozzle.

The use of existing stationary pins is initially less expensive, but relies upon the relative inability of the molten resin to flow into small orifices due to its viscosity, thixotropy, and particle size. Examples include: U.S. Pat. No. 5,820,889, which describes a pin with multiple apertures between 0.0025 and 0.0006 inches in diameter arranged to form a right triangle pattern; U.S. Pat. No. 4,855,094, which discloses a disk shaped insert with an orifice sufficiently small to effectively prevent entry of molten plastic; and U.S. Pat. No. 5,284,429, which discloses the use of a porous plug.

Restricting the size of the inlet opening may limit the intrusion of the thermoplastic material, but will not completely eliminate material flow into the nozzle. Such material flow is typically limited to strings of material which will cool in the nozzle body, but which still must be removed. One approach described in U.S. Pat. No. 5,151,278 has been to combine a restricted orifice (a pin seated in a smooth nozzle barrel creating an annular gap of 0.0078" for the flow of gas) and a reciprocating nozzle, such that the nozzle barrel is wiped clean when the nozzle reciprocates. Further steps to limit material intrusion are described in U.S. Pat. No. 5,164,200 to provide the pin seated within the smooth nozzle barrel with a variety of cross-sectioned configurations, including a hexagonal, oval, or threaded. These configurations are stated to create a turbulent air flow through the nozzle which throws the plastic outside of the path of gas flow, and thus restricting plastic intrusion.

Another similar approach of restricting material intrusion is described in U.S. Pat. No. 5,464,342, which provides a pin seated within a smooth barrel of the nozzle. The pin or multiple pins can be provided with enlarged diameter sections which would inhibit material intrusion into the barrel and, if it were desired to further restrict the flow of molten thermoplastic, a pin section having a threaded outer periphery. Additional pin/bore configurations are described in U.S. Pat. No. 4,905,901. The removable pin contains a threaded bore for gas flow into which a precision plug sized so that the exterior periphery of the plug contacts a crown portion of each thread to keep the plug in place. The flow is thus constrained to the helical threaded groove path and retards flow of thermoplastic material into the pin bore. The pin must be removed in order to remove the plugs or baffles or bluff bodies seated within the pin bore.

Such attempts to control the degree and effects of material intrusion illustrate the severity of the problem. While such efforts have achieved various degrees of success, they still require the disassembly of multiple parts for cleaning or replacement and require precisely machined or manufactured parts.

Another disadvantage of existing nozzle designs is the use of smooth bore conduit within the nozzle. If there is an over-packing situation, which can result if the molding control system fails to timely stop the material injection process, the plug that develops in the nozzle can be continuously pushed further into the smooth bore, and could eventually be pushed through the bore and into less accessible or more sensitive components. Further, replaceable pins for injection nozzles are known, but these smooth bore pins are difficult to clean, so they are typically discarded or "lost" by the molding operator.

Another aspect of gas injection nozzle design is the adjustability of the gas flow in terms of both volume and direction. As discussed in several of the above-referenced patents, it is seen as an advantage to direct the nozzle opening in the direction of the material flow, both to direct the gas flow to assist the material flow and to shield the opening from the direct material flow and thus reduce the effects of packing. Effects of selecting the direction of the gas flow (whether injecting or exhausting) upon the flow of the plastic material is discussed in U.S. Pat. No. 5,482,609. Further, it is desirable to be able to adjust the width of the nozzle opening for various applications to create a wider or more narrow gas injection pattern. Similarly, it is preferable to be able to adjust the size of the nozzle opening to be able to adjust gas velocity at a given gas pressure introduced into the nozzle. No simple and satisfactory or cost effective manner of adjusting the nozzle opening between applications is currently available.

An example of the uncertainty in the industry regarding gas injection pressures is shown in U.S. Pat. Nos. 5,118,455 and 5,039,463, which refers to fluctuating the gas supply pressure. Such attempts fail to recognize the dynamic pressure conditions which occur at the gas injection nozzle opening. Gas exiting the nozzle opening will experience an immediate drop in pressure as the gas enters the mold cavity and dissipates. Continued flow of gas will raise the gas pressure in the cavity near the nozzle until an air pocket develops, the pressure within the air pocket exceeding the fluid pressure of the semi-fluid plastic and displacing the hardening plastic throughout the mold. The pressure within the air pocket will fluctuate depending on the pressure of the gas flowing into the nozzle, and the viscosity, injection pressure, flow rate and cooling rate of the plastic material as it fills out the mold. It is very difficult to calculate the effect of these variables, so it is preferable to have a gas injection nozzle opening that can be easily and inexpensively adjusted during the run off of a mold to maximize the molding process, or during a lengthy run of parts on a given mold as the variables change to "tune" the process back to peak performance.

Wherefore, the objects of the present invention are to provide inexpensive interchangeable pins for a gas injection nozzle for injection molding apparatus, such pins having inexpensive interchangeable outlet components allowing for ready adjustment of the nozzle opening in size, direction and shape or configuration. Further, it is an object to provide a baffled gas passageway to resist intrusion of molten material, and a removable threaded shank that will collect any intruding material or flash in a manner that can be easily cleaned.

SUMMARY OF THE INVENTION

The present invention includes a nozzle having an internally threaded bore communicating through a mold body with a source of a pressurized gas, and an externally threaded pin received within and engaging the threaded bore. The pin has a machined longitudinal surface creating an air passage through the bore when the pin is in place. At the outlet end of the nozzle the pin carries one or more washers having air passages machined therein. The internally threaded nozzle and externally threaded pin are inexpensively manufactured and easily replaceable. The outlet washers are very inexpensively manufactured and can be stacked, or otherwise arranged to provide a wide variety of outlet configurations.

BRIEF DESCRIPTION OF THE DRAWINGS

FIG. 1 is a partial cross sectional view of a nozzle and pin assembly for a gas assist injection molding apparatus according to this present invention.

FIG. 2 is a cross sectional of a portion of the nozzle and pin assembly of FIG. 1 illustrating an alternate arrangement for the outlet assembly.

FIG. 3 is a cross section of a portion of the nozzle and pin assembly of FIG. 1 illustrating another alternate arrangement for the outlet assembly.

FIG. 4 is a partial cross sectional view of an alternate nozzle pin assembly for a gas assist injection molding apparatus according to this present invention.

DETAILED DESCRIPTION OF THE PREFERRED EMBODIMENT

A gas injection nozzle and pin assembly 10 for a gas assisted plastic injection molding system is illustrated in FIG. 1. The assembly 10 generally comprises a nozzle 12 having a threaded base 14, a collar 16, a cylindrical extension 18, and a cylindrical bore 20. The base 14 is screwed into a mating internally threaded gas port in the mold of a typical molding apparatus (not shown). It will be appreciated that the assembly 10 will be operative in a variety of molding applications including molten thermoplastic or wax, and in a variety of locations in the molding apparatus, including either the stationary or reciprocating portion of the mold or sprue. An elastomeric sealing ring 22 is provided to assure a fluid tight seal between the collar 16 and the gas port (not shown). The bore 20 communicates with the gas port of the molding apparatus which in turn communicates with a source of stored gas and a control mechanism for metering the flow of gas. These devices are known in the art. It will be appreciated that the nozzle and pin assembly can also be adapted to be used with reciprocating nozzles or pins known in the art.

At least a portion of the interior surface of the nozzle 12 which defines the bore 20 is provided with threads. This is a simple machining operation which can be performed with a great deal of accuracy at relatively low cost. A threaded pin 24 is inserted into and held within the nozzle body by simply screwing the pin 24 into the bore 20. The pin 24 may be any suitable commercially available threaded bolt with threads that match the internal thread of the bore, which in turn can be selected to match commercially available pins. The thread configurations can be of any known type, as long as they mate, including pipe threads which tend to provide a superior fluid seal.

The pin 24 is provided with a fluid passageway 26 by machining a surface of the pin flat, preferably removing material beyond the root of the threads. The machining process is simple and preferably creates a reduced surface from the bottom of the pin to its head 28. The remaining thread portions on the pin 24 will continue to mate with the threads within the bore 20, allowing the pin to be inserted and removed, and secure the pin 24 in position within the bore 20. The remaining thread portions also seal the passageway defined by the bore 20 except as defined by the pin passageway 26 and internal threads of the bore 20 adjacent thereto. It will be appreciated that the passageway 26 can be formed in a wide variety of shapes, including v-shaped or rounded (cylindrical), or in a variety of sizes by controlling the machining to remove a given pattern or varying amounts of material. Similarly, differing amounts or shapes of material may be removed along the length of the pin to create various flow patterns, and particularly to create turbulent flow. Further, multiple passageways 26 can be machined into the pin 24 to reduce the aperture size presented to the molten material and thus further restrict material intrusion. The flattened surface illustrated is the preferred passageway configuration for ease of manufacture and consistency of performance. Multiple pins having graduated depths of machining can be provided so that mold operators can incrementally increase or decrease the passageway size by replacing the pin in use with a pin with the next larger or smaller grind depth. Further, the flat surface is believed to provide a consistent but turbulent flow as the threads from the bore 20 that intrude into the passageway 26 act as baffles.

The passageway 26 also allows the pin to be self-cleaning. If material were to intrude into the passageway 26, the air flow will tend to force any strings into the threads of the bore 20. If there is an over packing situation, the threads of the bore 20 will resist the flow of material as the material expands to fill each thread groove, and then require the material to shear to pass the next thread crest. Even in a runaway over packing situation, the molten resin intruding into the nozzle should cool within the passageway 26 sufficiently to plug and halt the intrusion before reaching the end of the pin 24 and the recesses of the mold air supply system. Once the molten material sufficiently cools, the plug will resist shearing and thus will not advance down the passageway 26. By contrast, in systems that use smooth bore passageways, even the cooled plug can be forced farther down the passageway as cooled material does not significantly adhere to the smooth metallic bore or pin, nor is there a great deal of friction to oppose continued packing. Once a plug has formed in the passageway 26 and the over packing condition halted, the passageway 26 is simply cleaned by removing the pin 24. The external threads of the pin 24 strip any material from the grooves of the internal threads of the bore 20, as such material tends to adhere to the remainder of the plug on the recessed portion of the pin 24. Once the pin 24 is removed from the nozzle 12, the plug is simply peeled by hand off of the pin 24 and the pin 24 replaced.

This system is so simple and effective that the gas nozzles may be located in the stationary lower mold fixture, opposite the plastic injection nozzle which is typically located in the upper platen. Gas nozzles are generally not located opposite the plastic injection nozzle as the pressure of the plastic material is greater opposite the plastic injection nozzle and the plastic first impacts the mold wall opposite the plastic injection nozzle, yielding a longer dwell of plastic and thus increasing the likelihood of plastic intrusion.

The direct accessibility of the pin 24 enhances another advantage of the assembly shown in FIGS. 1 through 3. In the embodiment of FIG. 1, there is a single spacer or washer 30 with a pair of axially reduced shoulders 32 and 34. These shoulders 32 and 34 are easily and inexpensively created by machining portions from the face of a commercial available washer. The spaces 33 and 35 created between the pin head 28, washer shoulders 32 and 34, and the outlet shoulder 36 of the nozzle extension communicate with the passageway 26 and bore 20 to the gas supply. (It will be appreciated that the nozzle 36 shoulder may be flushed with the collar 16, depending on the distance (if any) the nozzle is selected to protrude into the mold cavity). Thus the spaces 33 and 35 define the gas outlets for the nozzle assembly. The spacer 30 need not be a cylindrical washer as pictured, but can be any type of spacer having a bore to allow insertion of the pin 24. In one embodiment, not shown, the spacer 30 comprises an internally threaded nut selected to seat upon the threaded pin, and is preferably assembled to leave a gap of approximately 0.010" between the distal face of the spacer nut and the inner shoulder of the head of the pin. In the embodiment of FIG. 1, the pin 24 has a smooth shank 38 which provides for a more secure seating of smooth bore washers such as the washer 30. Similarly, the axial length of the washer 30 or combined lengths of washers 30 can be chosen to adjust the distance the outlet protrudes into the mold cavity.

As illustrated in FIGS. 1 through 3, spacer washers can be machined and arranged to provide a virtually unlimited assortment of outlet arrangements. Typically, approximately one-half of the washer face surface is machined, such as by grinding. Thus, a 0.01" nozzle opening can be created by removing 0.01" from the washer face. As shown in FIG. 1, material can be removed from opposing faces of a single washer to create multiple openings. Entire portions of washers may be removed if desired, as illustrated in FIG. 2, which provides a more certain measure of the height of the opening created. As also shown in FIG. 2, multiple washers can be stacked to create multiple nozzle orifices and desired spacing therebetween. FIG. 3 illustrates another arrangement of three stacked washers each having a removed portion forming a nozzle orifice.

It should be appreciated that a variety of methods exist for removing portions of the washers to create a variety of orifice configurations. For example, a cylindrical washer could be drilled to provide multiple ports about its circumference, resulting in a 360° outlet of gas. Further, x-shaped or rounded grooves can be machined into the washer faces, providing potentially desirous outlet profiles. The embodiment of FIG. 1 has proven to provide a desirous combination of ease of manufacture, assembly, replacement, gas injection control and material intrusion prevention.

The spacer/outlet 30 is easily removed for cleaning and/or replacement by removing the pin 24. The head of the pin 24 may be slotted or have some other indentation or configuration suitable for receiving a tool for loosening/removing or tightening/installing the pin. If it is desired to control the direction of the gas flow, the washer 30 may be held in the desired orientation while the pin 30 is tightened. Gas flow direction may similarly be adjusted by loosening the pin, adjusting the washer 30, holding the washer in the new position and tightening the pin 30.

The use of the spacers 30 to determine the outlet configuration for gas flow is not dependent upon the use of a threaded pin and bore assembly. It may be preferred to utilize a different locking system for the pin, such as one or more axial keyway grooves within a smooth bore corresponding to key tabs on the pin. The key tabs are inserted into the keyways as the pin is inverted into the bore, the bore of the nozzle has corresponding circumferential locking grooves so that the pin can be rotated, moving the key tabs into the locking grooves and restricting axial movement. This embodiment (not shown) preferably includes the use of resilient elastomeric washers in addition to the metallic washers having reduced portions forming the gas outlet. The elastomeric washers will axially compress when the pin is inserted and locked, providing an axial biasing force holding the pin in its located position and providing a sealing force between the pin head, stacked washers and nozzle body.

It can be seen that the embodiment of FIGS. 1 through 3 provides a great deal of flexibility and control over the gas injection process at a relatively low cost and with minimal change time or effort. By providing an assortment of interchangeable stackable washers and several pins having various degrees of material removed, a mold designer or operator has a virtually unlimited number of flow outlet configurations which can be changed in just a few minutes or less.

FIG. 4 illustrate another embodiment which provides even more instantaneous variability of the size of the outlet. In FIG. 4 the assembly 110 includes a nozzle 112 having a threaded base 114, a collar 116, a cylindrical extension 118, and a cylindrical bore 120. An elastomeric sealing ring 122 is provided to assure a fluid tight seal between the collar 116 and the gas port (not shown). The bore 120 communicates with the gas port of the molding aperture which in turn communicates with a source of stored gas and a control mechanism for metering the flow of gas. At least a portion of the interior surface of the nozzle 112 which defines the bore 120 is provided with threads. A threaded pin 124 is inserted into and held within the nozzle body 118 by simply screwing the pin 124 into the bore 120. The pin 124 is provided with a fluid passageway 126 by machining a surface of the pin flat, preferably removing material beyond the root of the threads.

The manufacture and operation of this embodiment is substantially similar to the embodiment of FIGS. 1 through 3. The embodiment of FIG. 4 is different in at least one material aspect, in that spacers are not utilized to defme the nozzle outlets. Rather, the head 128 of the pin 124 has a frustroconical configuration which nests within the conical nozzle end 136. The size of the nozzle outlet is determined by the distance between the head 128 and nozzle end 136, which is determined by the distance the pin is inserted into the nozzle housing 112. Thus, in operation, the nozzle outlet size can be quickly adjusted by rotating the pin 124. This assembly does not provide a highly accurate means of adjusting orifice size, but does provide the ability to nearly instantly adjust the nozzle outlet.

In view of the foregoing, it is to be understood that the drawings, discussion and description herein are merely meant to represent particular embodiments of the invention and are not meant to be a limitation upon the practice thereof. It is the following claims, including all equivalents, which define the scope of the invention.

What is claimed is:

1. A nozzle and pin assembly for a gas assisted injection molding system, said assembly comprising:
    a nozzle body, positioned with a cavity of an injection mold, having a threaded first fluid passageway connected to as source of pressurized gas;
    an elongated threaded pin threadingly engaged within said passageway, said pin having a recessed threaded section creating a second smaller fluid passageway.

2. A nozzle and pin assembly of claim 1 wherein said pin further comprises an enlarged head external of said first passageway.

3. A nozzle and pin assembly of claim 2 wherein said enlarged head is larger than the cross section of said first passageway.

4. A nozzle for a gas assisted injection molding apparatus, said nozzle comprising:
    a body having an inlet connected to a pressurized source of gas, an outlet positioned within a cavity of an injection mold, and a threaded passageway between said inlet and outlet;
    a pin received within said passageway, said pin having an elongated longitudinal threaded section having a recessed surface portion along said threaded section and an enlarged head portion;
    at least one spacer axially between said head and said body.

5. The nozzle of claim 4 wherein said spacer comprises at least one annular washer having at least one recessed planar surface forming a fluid passageway.

6. The nozzle of claim 5 wherein said spacer comprises at least two annular washers having at least one recessed planar surface forming a fluid passageway.

7. The nozzle of claim 4 wherein said spacer comprises at least one annular washer having at least two recessed planar surfaces forming fluid passageways.

8. The nozzle of claim 4 wherein said spacer comprises at least one annular washer having at least one recessed longitudinal surface forming a fluid passageway.

9. The nozzle of claim 4 wherein said spacer is a n annular nut having an internal threaded portion and at least one recessed planar surface forming a fluid passageway.

10. The nozzle of claim 4 wherein said spacer has an outlet connected to said passageway.

11. An injection molding apparatus comprising:
    a mold having a fixed platen and a reciprocating platen;
    a plastic injection nozzle connected to a source of molten plastic, said plastic injection nozzle located in one of said mold platens;
    at least one gas injection nozzle located in the other of said mold platens, said gas injection nozzle in fluid communication with a source of compressed gas and having an internally threaded bore;
    a pin assembly comprising an externally threaded pin threadingly engageable with said threaded bore, said pin further having a recessed surface portion and an enlarged head portion, and at least one annular washer held between said head and said nozzle, said washer having a passageway in fluid communication with said nozzle.

* * * * *

UNITED STATES PATENT AND TRADEMARK OFFICE
CERTIFICATE OF CORRECTION

PATENT NO. : 6,354,826 B1
DATED : March 12, 2002
INVENTOR(S) : Ronald Thomas

It is certified that error appears in the above-identified patent and that said Letters Patent is hereby corrected as shown below:

Column 7,
Line 18, delete "defme" and insert -- define --

Column 8,
Line 27, delete "a n" and insert -- an --

Signed and Sealed this

Twenty-first Day of May, 2002

*Attest:*

*Attesting Officer*

JAMES E. ROGAN
*Director of the United States Patent and Trademark Office*